April 26, 1966  R. E. MITTON  3,248,131
ADAPTER ASSEMBLY FOR FLUID PRESSURE CONTROL APPARATUS
Filed Aug. 10, 1962

INVENTOR.
ROBERT E. MITTON
BY Elliott & Pastoriza
ATTORNEYS

United States Patent Office 3,248,131
Patented Apr. 26, 1966

3,248,131
ADAPTER ASSEMBLY FOR FLUID PRESSURE
CONTROL APPARATUS
Robert E. Mitton, San Diego, Calif.
Filed Aug. 10, 1962, Ser. No. 224,265
(Filed under Rule 47(b) and 35 U.S.C. 118)
3 Claims. (Cl. 285—130)

This invention relates to a fluid pressure control apparatus and more particularly to an improved fluid pressure amplifying device primarily useful in automobile power brakes.

This application relates to subject matter originally disclosed in U.S. Patent 3,036,436.

The objects of this invention are similar to those set forth in patent application Serial No. 91,369, filed February 24, 1961, for Fluid Pressure Control Apparatus, now abandoned. In this latter application, there is disclosed a fluid pressure control apparatus including a cylindrical body having a fluid pressure inlet at one end and a fluid pressure outlet at the opposite end. The design of the device is such that up to a given inlet fluid pressure a corresponding outlet fluid pressure would be provided, and as soon as the given inlet fluid pressure was exceeded, the outlet fluid pressure would become a multiple of the inlet pressure. By such an arrangement, a desirable control for an automobile could be realized in that the power action of the brakes would not be exercised except when the brakes were fully applied by the user. When only a small amount of braking is used, the device has effectively no influence on the pressures involved.

In the instant invention, there is provided a similar fluid pressure apparatus which has as its primary object to provide an improved adapter assembly comprising inlet and outlet fluid means which may be more readily adapted to different types of automobiles and in which the actual physical connection and disconnection of the device to such automobiles is enormously simplified.

Briefly, this object is attained by providing an elongated cylindrical body as in the referred to prior patent application. However, rather than having the outlet connection at the lower end of the body, the outlet connection is brought out from the upper end of the body by means of an adapter assembly in axial alignment with the fluid input connection. A piston is provided within the body and guided in up and down movement by a central stem as in the prior application. In the instant case, however, the stem is hollow and communicates with the interior of the cylinder beneath the piston, the upper end of the stem communicating with the outlet portion of the adapter assembly at the upper end of the cylindrical chamber. By this arrangement, the stem serves the dual function of a guide for the piston and also as a communication means for transmitting outlet fluid pressure from the chamber below the piston to the outlet connection.

With both the inlet and outlet structure constituting the adapter assembly disposed at the same end of the elongated body, installation is greatly simplified. Further, by employing removable inlet and outlet connecting members to form the adapter assembly, they may be readily removed and replaced by other members of different diameter or thread size so that the device may be adapted to many different types of cars.

A better understanding of the invention will be had by now referring to the accompanying drawings, in which.

Figures 1, 2:
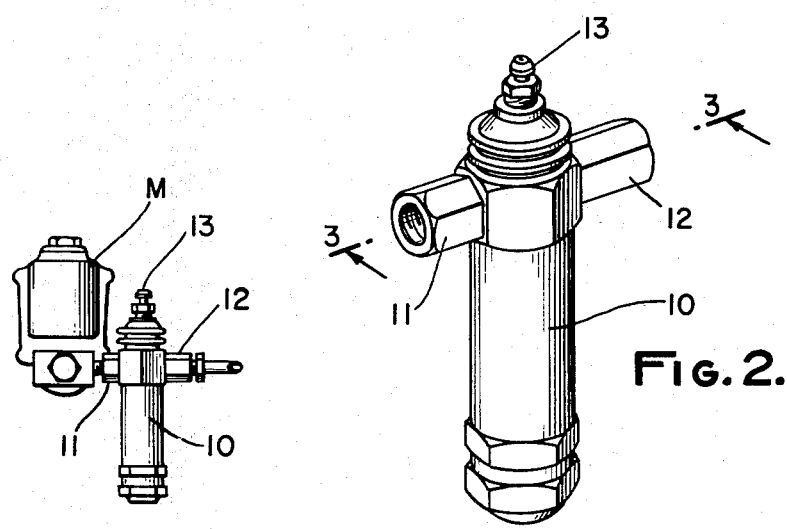
FIGURE 1 is a diagram of the improved fluid pressure control apparatus of this invention connected between the master brake cylinder and brake drum line.
FIGURE 2 is a perspective view of the apparatus itself.

Referring to FIGURES 1 and 2, the device comprises an elongated body 10 having a fluid inlet member 11 connected to the master brake cylinder M and fluid outlet member 12 adjacent the same upper end portion of the body connecting to a fluid line L leading to the brake drum. Preferably, the inlet and outlet members 11 and 12 are in axial alignment. Also shown is a small bleeder screw 13 closing an upper bore opening communicating with the interior of the body 10 for permitting air to escape when filling the body.

In the operation of the device shown in FIGURE 1, inlet hydraulic fluid pressure from the brake master cylinder M of the automobile and outlet fluid pressure to the line L are maintained the same up to a given inlet fluid pressure level. After this given pressure level has been exceeded, the outlet pressure from 12 becomes a multiple of the inlet pressure so that an amplification of the pressure takes place.

Figure 3:
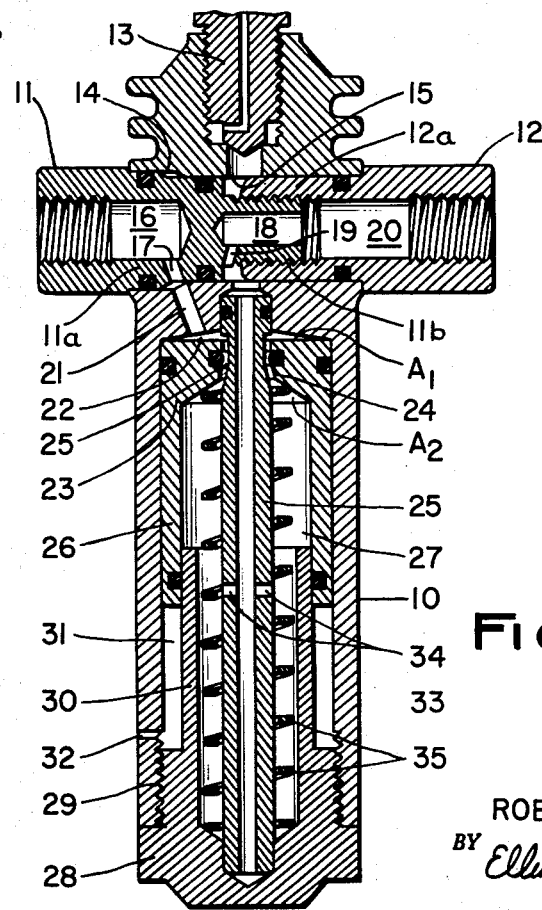
FIGURE 3 is an enlarged cross section taken in the direction of the arrows 3—3 of FIGURE 2.

Referring now to the enlarged cross section of FIGURE 3, the manner in which the foregoing pressure characteristics are realized will be evident. As shown, the inlet member 11 includes an enlarged base portion 11a and smaller nipple end portion 11b. The nipple 11b is externally threaded as shown. The outlet member 12 on the other hand terminates in an internally threaded structure 12a for receiving the external threads of the nipple 11b. By this arrangement, the members 11 and 12 may be inserted into opposite ends of the body 10 and threaded together.

To accommodate these members, the upper end of the body 10 includes a transverse bore having a large diameter entrance portion 14 tapering downwardly to a reduced diameter portion 15. The base portion 11a of the member 11 is received within the bore portion 14 and the smaller nipple portion 11b within the bore portion 15.

The inlet member 11 also includes an interior bore 16 communicating with a transverse passage 17 in turn passing into the annular space defined by the shoulder portion between the bore 14 and bore 15. The end portion of the inlet member 11 shown at 11b also includes an internal bore 18 communicating through a passage 19 with the reduced diameter bore portion 15. The end portion of the member 12 includes an internal passage 20 for communicating with a suitable outlet conduit connection. As shown, the bores 16 and 20 for the inlet and outlet members 11 and 12 are respectively threaded to receive suitable hose connections.

With the above arrangement, the members 11 and 12 may be unthreaded and removed without requiring any disassembly of the body 10. Other members having different threads for connection to the cylinder and brake drum chamber may be substituted so that the body 10 can be used with many different types of cars.

As shown, the upper portion of the body 10 includes a passage 21 passing from the upper region 22 of the body through passage 17 to inlet member 11. Within the upper body portion there is provided a piston 23 having a central opening 24 surrounding the upper portion of a stem 25. As shown, the stem includes a constricted area 25' so that when the piston 23 is in its uppermost position, there is provided an annular passage between the constricted area 25' and the opening 24 in the piston head. This annular passage places the upper region 22 above the piston 23 in communication with the lower interior of the chamber below the piston 23.

As shown, the piston includes a downwardly extending annular sidewall 26, the interior surface thereof together with the exterior surface of the stem 25 defining a lower chamber region 27.

The extreme lower end of the elongated body member 10 is closed by a plug 28 threaded to the lower end of the tube 10 as at 29 and including an upwardly extending annular wall 30. The exterior of the wall 30 and the interior of the walls of the cylinder 10 define an annular space 31 for receiving the downwardly depending annular wall 26 of the piston 23. A small air bleeder port 32 permits air to escape from the annular space 31 when the downwardly extending annular wall 26 of the piston 23 is moved into the annular space 31.

The central tubular stem 25 itself includes a central passage 33 and lateral ports 34 placing the passage 33 in communication with the region 27 below the piston 23. As shown, the passage 33 within the stem communicates with the upper portion of the body 10 passing from the reduced bore 15 and thus is placed in communication through the passage 19 with the outlet member 12. The outlet member 12 is thereby in fluid communication with the interior chamber below the piston 23 whereas the inlet fluid member 11 is in communication with the interior chamber above the piston 23.

The top area of the piston 23 is designated $A_1$ in FIGURE 3. The effective bottom area of this piston is designated $A_2$, and it will be evident that $A_2$ is less than $A_1$. A coil spring 35 normally biases the piston 23 to its uppermost position as shown, wherein the central opening 24 encircles the restricted area 25′ of the stem so that the upper portion 22 is in fluid communication with the lower portion 27.

In the operation of the device as shown in FIGURE 3, inlet fluid pressure will bear against the area $A_1$, but until this pressure exceeds the pressure exerted by the spring 33, the piston will remain in its uppermost position so that the fluid pressure will be communicated through the annular passage about the constricted neck area of the stem 25 to the lower portion of the piston 23. This fluid pressure will then be communicated through the passages 34 to the central passage 33 and the stem 25 and to the outlet member 12. Thus, variations in the inlet fluid pressure will provide corresponding variations in the outlet fluid pressure so long as the inlet fluid pressure remains below a given value determined by the strength of the coiled spring 35.

If now the inlet fluid pressure exceeds the given pressure, as would occur for example in a power brake action under an emergency, the piston 23 will be urged downwardly as a consequence of the greater area $A_1$ over the area $A_2$. As the piston moves downwardly, the constricted portion 24 will engage the enlarged normal outside diameter portion of the stem 25 in sealing engagement, thereby cutting off the communication between the upper and lower chamber regions. Since the area $A_1$ is larger than the area $A_2$, the pressure in the region 27 below the piston 23 will be greater than that in the region 22 above the piston so that the outlet pressure will then become a multiple of the inlet pressure in accordance with the ratio of the areas $A_1$ over $A_2$. A fluid amplification therefore takes place and will only take place after a given pressure determined by the spring 35 is exceeded.

Insofar as the foregoing operation as described is concerned, it is similar to that set forth in the prior referred to U.S. Patent 3,036,436. The particular advantage of the structure shown in FIGURE 3 corresponding to this particular invention is having both the inlet and outlet means at the same end of the cylinder so that installation of the device is greatly simplified.

What is claimed is:

1. An adapter assembly for fluid pressure control apparatus having fluid communicating means therein and a transverse bore at one end of said apparatus extending from wall to wall thereof and intersecting said fluid communicating means; a fluid inlet member received within one end of said transverse bore and including an interior bore and a passage extending therefrom and communicating with said fluid communicating means to said transverse bore, said inlet member including a blind end portion having external threads; and a fluid outlet member received within the other end of said transverse bore and including a through internal passage; fluid conducting means joining said through internal passage with said fluid communicating means, said outlet member including internal threads threaded to the externally threaded end portion of said inlet member within said transverse bore, the exposed ends of said inlet and outlet members extending from opposite ends of said transverse bore being in axial alignment and of larger diameters than the internal diameter of said transverse bore whereby threading of said outlet member to said end portion of said inlet member locks said members within said transverse bore of said apparatus.

2. An adapter assembly according to claim 1, in which the exposed ends of said inlet and outlet members are threaded for connection into a fluid pressure line.

3. An adapter assembly according to claim 2, in which said fluid communicating means constitutes a fluid inlet opening and a fluid outlet opening, said passage in said inlet member communicating with said fluid inlet opening, said fluid communicating means being in said end portion of said inlet member and comprising an internal bore and a transverse passage extending therefrom and communicating with said fluid outlet opening, and said through internal passage in said outlet member communicating through said fluid conducting means and said fluid communicating means with said internal bore in said end portion of said inlet member.

References Cited by the Examiner

UNITED STATES PATENTS

| 1,903,819 | 4/1933 | Kocher | 285—150 |
| 1,995,098 | 3/1935 | Healy | 285—130 |
| 2,520,896 | 8/1950 | Smulski | 285—190 |

FOREIGN PATENTS

| 686,638 | 1/1953 | Great Britain. |

CARL W. TOMLIN, *Primary Examiner.*

S. R. MILLER, *Assistant Examiner.*